US010777201B2

(12) United States Patent
Trufinescu et al.

(10) Patent No.: US 10,777,201 B2
(45) Date of Patent: Sep. 15, 2020

(54) VOICE ENABLED BOT PLATFORM

(71) Applicant: Microsoft Technology Licensing, LLC, Redmond, WA (US)

(72) Inventors: Adina Magdalena Trufinescu, Redmond, WA (US); Khuram Shahid, Seattle, WA (US); Daniel J. Driscoll, Seattle, WA (US); Adarsh Sridhar, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 131 days.

(21) Appl. No.: 15/630,873

(22) Filed: Jun. 22, 2017

(65) Prior Publication Data
US 2018/0130471 A1 May 10, 2018

Related U.S. Application Data

(60) Provisional application No. 62/418,113, filed on Nov. 4, 2016.

(51) Int. Cl.
*G10L 15/26* (2006.01)
*G06F 3/16* (2006.01)
(Continued)

(52) U.S. Cl.
CPC ............ *G10L 15/265* (2013.01); *G06F 3/167* (2013.01); *G06F 9/453* (2018.02); *G10L 13/033* (2013.01); *G10L 2015/225* (2013.01)

(58) Field of Classification Search
CPC ... G10L 15/22; G10L 15/1815; G10L 15/005; G10L 15/16; G10L 15/26; G10L 15/265;
(Continued)

(56) References Cited

U.S. PATENT DOCUMENTS 5,860,064 A * 1/1999 Henton ................. G10L 13/033
 204/266
6,012,030 A * 1/2000 French-St. George ......................
 H04M 1/72522
 704/270
(Continued)

FOREIGN PATENT DOCUMENTS

CA 2585957 A1 10/2008

OTHER PUBLICATIONS

Bashmaokv, Pavlo, "Advanced Natural Language Processing Tools for Bot Makers—LUIS, Wit.ai, Api.ai and others", https://stanfy.com/blog/advanced-natural-language-processing-tools-for-bot-makers/, Retrieved on: Nov. 8, 2016, 22 pages.
(Continued)

*Primary Examiner* — Abdelali Serrou
(74) *Attorney, Agent, or Firm* — Alleman Hall Creasman & Tuttle LLP

(57) ABSTRACT

A server is provided, including a processor configured to execute a bot server program. The bot server program may receive from a computing device an input with an input type that includes one or more of speech and text. The bot server program may programmatically generate an output, wherein the output is generated based on the input. The bot server program may detect one or more output types capable of being output by the computing device and select an output type from a plurality of output types that may include speech and text. The selected output type may be an output type capable of being output by the computing device. The bot server program may modify the programmatically generated output to produce a modified output with the selected output type, and may convey the modified output to the computing device for output on a display and/or speaker.

19 Claims, 4 Drawing Sheets

(51) Int. Cl.
*G06F 9/451* (2018.01)
*G10L 15/22* (2006.01)
*G10L 13/033* (2013.01)

(58) Field of Classification Search
CPC ... G10L 15/32; G10L 2015/223; G10L 25/24; G10L 25/51; G10L 25/63; G10L 2015/225; G10L 13/033; G06F 9/453; G06F 3/167
See application file for complete search history.

(56) References Cited

U.S. PATENT DOCUMENTS

| | | | |
|---|---|---|---|
| 7,921,214 B2 | 4/2011 | Da Palma et al. | |
| 8,060,565 B1 | 11/2011 | Swartz | |
| 8,438,023 B1* | 5/2013 | Hamilton | G10L 15/22 704/231 |
| 8,457,964 B2* | 6/2013 | Jaiswal | G10L 15/26 704/235 |
| 8,489,769 B2 | 7/2013 | Chuah | |
| 8,874,447 B2 | 10/2014 | Da Palma et al. | |
| 8,924,219 B1* | 12/2014 | Bringert | G06F 3/04842 704/275 |
| 9,361,883 B2* | 6/2016 | Paek | G10L 15/26 |
| 9,369,410 B2 | 6/2016 | Capper et al. | |
| 2006/0095265 A1* | 5/2006 | Chu | G10L 13/033 704/268 |
| 2006/0165104 A1* | 7/2006 | Kaye | G06F 17/30964 370/401 |
| 2008/0126491 A1 | 5/2008 | Portele et al. | |
| 2009/0177736 A1* | 7/2009 | Christensen | G06Q 30/02 709/203 |
| 2010/0199320 A1 | 8/2010 | Ramanathan et al. | |
| 2010/0299436 A1* | 11/2010 | Khalid | G06F 1/1643 709/226 |
| 2011/0099011 A1* | 4/2011 | Jaiswal | G10L 15/26 704/235 |
| 2011/0238191 A1* | 9/2011 | Kristjansson | G06F 1/1626 700/94 |
| 2011/0283190 A1* | 11/2011 | Poltorak | G10L 13/033 715/716 |
| 2012/0173225 A1 | 7/2012 | Da palma et al. | |
| 2012/0173574 A1* | 7/2012 | Homma | G06F 16/68 707/772 |
| 2012/0237009 A1* | 9/2012 | Szpilfogel | H04M 3/42382 379/88.13 |
| 2012/0240045 A1* | 9/2012 | Bradley | G10L 13/04 715/716 |
| 2012/0265528 A1* | 10/2012 | Gruber | G10L 15/18 704/235 |
| 2012/0271643 A1* | 10/2012 | Da Palma | G10L 15/22 704/275 |
| 2013/0070911 A1* | 3/2013 | O'Sullivan | H04M 1/645 379/88.04 |
| 2013/0268260 A1* | 10/2013 | Lundberg | G06F 17/28 704/8 |
| 2013/0326543 A1* | 12/2013 | Aull | G06F 9/544 719/321 |
| 2014/0089853 A1* | 3/2014 | Paushkina | G06F 3/0488 715/825 |
| 2014/0122618 A1* | 5/2014 | Duan | H04L 51/02 709/206 |
| 2014/0274203 A1* | 9/2014 | Ganong, III | H04W 52/0251 455/556.1 |
| 2015/0373428 A1* | 12/2015 | Trollope | G06F 16/7844 704/235 |
| 2016/0170946 A1* | 6/2016 | Lee | G06F 40/14 715/234 |
| 2017/0300292 A1* | 10/2017 | Torrini | G06F 3/167 |
| 2017/0330561 A1* | 11/2017 | Nakatsu | G06F 3/165 |
| 2018/0308487 A1* | 10/2018 | Goel | G10L 15/265 |
| 2019/0019512 A1* | 1/2019 | Taki | G06F 3/167 |

OTHER PUBLICATIONS

Hollan, Jeff, "Bot Framework made better with Azure", https://azure.microsoft.com/en-in/blog/bot-framework-made-better-with-azure/, Published on: Apr. 6, 2016, 4 pages.

\* cited by examiner

VOICE ENABLED BOT PLATFORM

CROSS REFERENCE TO RELATED APPLICATIONS

This application claims priority to U.S. Provisional Patent Application 62/418,113, filed Nov. 4, 2016, the entirety of which is hereby incorporated herein by reference.

BACKGROUND

Chatbots today are software programs that are built around a messaging paradigm in which a chat client program exchanges text, and in some cases visual cards, with a server-side chatbot program. Chatbot programs may be built, for example, using the Microsoft® Bot Framework. Chatbot programs developed with such a framework can be designed to send and receive messages with various user-side chat client programs. However, there is generally a lack of support for speech-enabled conversations among available user-side chat client programs.

One prior approach to using speech input with user-side chat client programs is to program a speech-to-text conversion program that enables a user to provide speech input that is converted to text and entered into a text box in the user-side chat client program, such that instead of having to type a response a user may click a button to speak a response that is populated into the textbox. The user may then press "enter" to send the text message to the chatbot server over a computer network. However, drawbacks with this approach exist, as discussed below.

SUMMARY

According to one aspect of the present disclosure, a server is provided, comprising a processor configured to execute a bot server program. The bot server program may receive from a computing device an input with an input type that includes one or more of speech and text. In addition, the bot server program may programmatically generate an output, wherein the output is generated based on the input. The bot server program may detect one or more output types capable of being output by the computing device. The bot server program may further select an output type from a plurality of output types. The plurality of output types may include speech and text, and the selected output type may be an output type capable of being output by the computing device. The bot server program may modify the programmatically generated output to produce a modified output with the selected output type. The bot server program may further convey the modified output to the computing device for output on a display and/or speaker.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The inventors have recognized shortcomings with the state of chatbots (henceforth called bots), in that they do not support dialogs that include a mixture of speech and text inputs and outputs. The inventors have recognized that speech is not always a convenient mechanism to enter data, particularly when the data has a complicated format, and further, the user client device may not be equipped with a microphone, or may be temporarily located in an environment that has loud background noise preventing proper speech input. Further, the inventors have recognized that text entry is not always a convenient mechanism for data entry, such as when the user cannot look at the display, or when the user's hands are occupied. Further still, some chat dialogs may include portions in which it is more convenient to provide text input and portions in which it is more convenient to provide speech input. Further still, a single user may transition environments or activities such that at a first point in time during the dialog speech input is more convenient whereas at a second point in time text input is more convenient, or vice versa.

To address the above issues, in this disclosure a platform is proposed that extends the MICROSOFT Bot Framework and allows a developer to author a single bot that works on existing clients (e.g., SKYPE, FACEBOOK messenger) that do not support speech enabled input, and also supports speech enabled clients (e.g. CORTANA or UNIVERSAL WINDOWS PLATFORM application).

Figure 1:
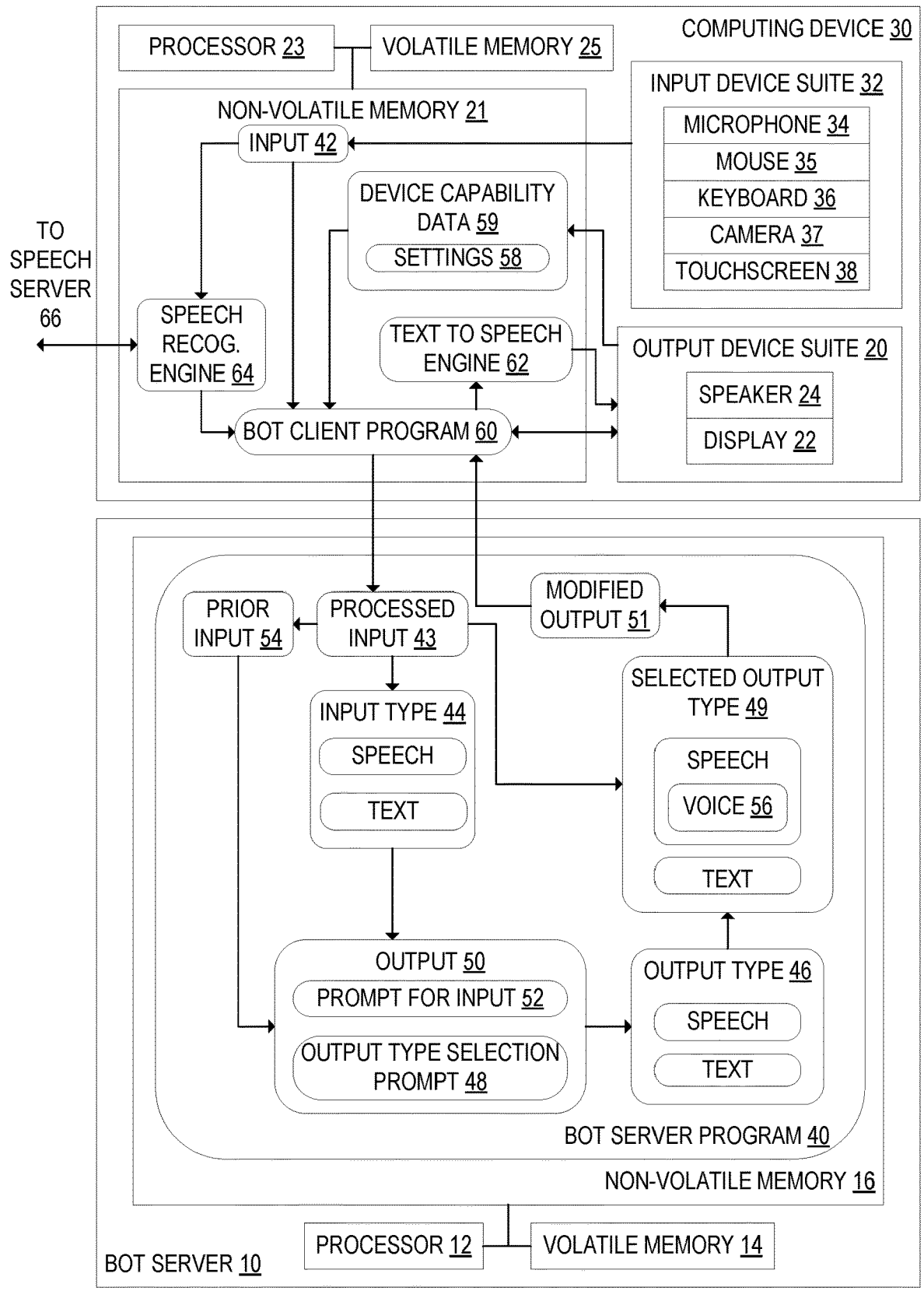
FIG. 1 shows a schematic representation of a bot server and a computing device configured to execute a bot server program and bot client program, according to an embodiment of the present disclosure.

FIG. 1 schematically shows a bot server 10, including a processor 12, volatile memory 14, and non-volatile memory 16. FIG. 1 also schematically shows a computing device 30 that communicates with the bot server 10, including an input device suite 32 and an output device suite 20. The input device suite 32 may include input devices such as a microphone 34, a mouse 35, a keyboard 36, a camera 37, and/or a touchscreen 38 configured to receive touch inputs on graphical user interface elements, as well as other input devices. The output device suite 20 may include a display 22 and/or a speaker 24, as well as other output devices. The computing device 30 also includes a processor 23, non-volatile memory 21, and volatile memory 25. The computing device 30 may be a laptop computer, smartphone, tablet, or desktop computer, as some examples.

The processor 12 of the bot server 10 is configured to execute a bot server program 40. The bot server program 40 may interact with a user in a dialog in which the bot server program 40 produces one or more output responses in response to receiving one or more inputs 42 from the computing device 30. For example, a bot server program 40 may be a chatbot that produces text responses in response to text inputs.

The computing device 30 receives an input 42 from the user via the input device suite 32. The input 42 has an input type 44 that includes one or more of speech and text. The computing device 30 may use a microphone 34 included in the input device suite 32 together with a speech recognition engine 64 to detect a spoken keyword or phrase, for example "Hey [bot name]," to start receiving the input 42. The speech recognition engine 64 may communicate with a speech server 66 in order to convert a spoken input into text. For example, in order to reduce the amount of processing performed by the computing device 30, the speech recognition engine 64 may transmit a speech input to the speech server 66 over a network, and may subsequently receive a text input produced at the speech server 66 based on the speech input.

Speech converted into text by the speech recognition engine 64 may be included in a processed input 43. The processed input 43 may also include text entered using the keyboard 36 of the computing device 30. In addition, the processed input 43 may include data indicating whether the raw input 42 was a speech or text input. The speech recognition engine 64 may also determine other features of a speech input, such as the emotional state of the user, which may be included in the processed input 43. The processed input 43 may also include data indicating what output devices are included in the output device suite 20 of the computing device 30, and which of those output devices are currently receiving power. It will be appreciated that the speech recognition engine 64 may be provided as a service or API of an operating system, such as WINDOWS, of the computing device 30, as one example.

The bot client program 60 may convey the processed input 43 to the bot server 10, via a computer network connection over a computer network, which may be a wide area network such as the Internet. Conveying the processed input 43 to a bot server 10 for further processing, rather than performing that processing on the computing device 30, allows the computing device 30 to avoid performing computationally intensive processes involved in producing an output 50. Those processes are instead performed by the bot server 10, which can typically perform them more quickly than the computing device 30. The processed input 43 may be stored in a list of prior processed inputs 54 in case the dialog includes more than one input 42. This can have advantages such as decreased power consumption by the computing device 30, which is particular valued in battery powered mobile devices, and the ability to run the bot server program 40 within a bot framework hosted on the bot server 10. In an alternative configuration (not illustrated), the bot server program 40 may be executed locally on the client computing device 30. As another alternative (also not illustrated), the functions of the bot server program 40 may be combined with the functions of the bot client program 60 and run as an integrated bot program on the computing device 30, without the need to contact the bot server 10.

Returning to the illustrated configuration, the bot server program 40 executed by the bot server 10 may detect an input type 44 of the processed input 43. The input type 44 may include speech and/or text. The bot server program 40 then programmatically generates an output 50, wherein the output 50 is generated based on the processed input 43.

The bot server program 40 then determines one or more output types 46 capable of being output by the computing device 30. The bot server program 40 selects a selected output type 49 from a plurality of output types 46 that are capable of being output by the computing device 30. The plurality of output types 46 includes speech and text, and may also include other output types 46.

Computing device 30 may have various software settings 58 as well as various hardware components such as input device suite 32 and output device suite 20, and various programs such as the speech recognition engine 64 and text to speech engine 62 installed thereon, which collectively affect the device capabilities. Data representing the device capabilities of computing device 30 is referred to herein as device capability data 59, one example of which may be a user setting 58, and other examples of which may be registry entries, device drivers for I/O devices, and software program installation records. As discussed briefly above, one way that the device capabilities may be determined is by the bot client program 60 querying settings 58 or other device capability data 59 of the computing device 30. For example, the device capability data 59 may be determined at least in part by receiving data as part of the processed input 43 that indicates what output devices are included in the output device suite 20 of the computing device 30, and which of those output devices are currently receiving power. As another example, the user may select a preference for speech outputs using the bot client program 60 or other software on the device, and the preference may be saved as a setting 58. This setting 58 may be stored as device capability data 59 in non-volatile memory and later transmitted within processed input 43 as metadata to be used when the bot server program 60 selects a selected output type 49. Alternatively, settings 58 or other device capability data may be separately transmitted by the bot client program 60 to the bot server program 40, not as part of processed input 43. From such device capability data 59, as another example, the bot server program 40 may determine that other application programs that may produce outputs in the form of sound are being executed on the computing device 30, and select text as the selected output type 49 based on this determination.

Once it has selected a selected output type 49, the bot server program 40 modifies the programmatically generated output 50 to produce a modified output 51 that has the selected output type 49. This modification may include converting text to speech, or to a selected output type 49 that may be converted to speech by a text to speech engine 62 on the computing device 30. The bot server program 40 then conveys the modified output 51 to the bot client program 60. The bot client program 60 may then convey the modified output 51 for output on a display 22 and/or speaker 24. If the modified output 51 includes speech, the bot client program 60 may convey the modified output 51 to the text to speech engine 62, which may then convert the modified output 51 to speech. The text to speech engine 62 may then convey the modified output 51 to be spoken by a speaker 24.

Further criteria which the bot server program 40 may use to select the selected output type 49 are described below. The bot server program 40 may select the selected output type 49 based on the content of the processed input 43. In one example, the bot server program 40 may use variables that give a probability that the modified output 51 will include speech and a probability that the modified output 51 will include text. Based on features of the processed input 43, the bot server program 40 may update these probabilities. In this example, the bot server program 40 may initially assign the modified output 51 a base probability P(speech) of including speech and a base probability P(text) of including text before performing any analysis of the features of the processed input 43. If the input 42 includes the sentence "Tell me how to get home," the bot server program 40 may update the probability P(speech) based on the presence of the word "tell" in the processed input 43. The bot server program 40 may multiply the probability P(speech) of the output 51 including speech by a quotient P(Tell|speech)/P(Tell) in order to obtain an updated probability P(speech|Tell). The bot server program 40 may do the same to obtain an updated probability that the modified output 51 includes text.

The bot server program 40 may also select the selected output type 49 based on content included in the output 50. For example, if the output 50 includes an equation, the bot server program 40 may increase P(text) and decrease P(speech).

The programmatically generated output 50 may include an output type selection prompt 48. For example, the output 50 may include an option to select speech and/or text as the selected output type 49 for a subsequent output 50. The selected output type 49 specified by the user in response to the output type selection prompt 48 may be stored in the prior input 54.

The bot server program 40 may produce select a selected output type 49 that includes both speech and text. For example, the modified output 51 may include text and a spoken version of the same text. Alternatively, when the modified output 51 includes both speech and text, the speech included in the modified output 51 and the text included in the modified output 51 may contain different content. For example, the speech included in the modified output 51 may use contractions when the text does not.

The selected output type 49 may include other forms of output in addition to speech and text, such as images or cards which are composites of images and text and other interactive graphic elements. These other forms of output may be output in combination with speech and/or text. For example, in response to the input "Show me how to get home," the modified output 51 of the bot server program 40 may include an image of a map, directions in the form of text, and spoken directions.

The programmatically generated output 50 may sometimes include a prompt 52 for an additional input 42 from the user. The bot server program 40 may generate an output 50 based on the additional input 42 as well as one or more prior processed inputs 54. The additional input 42 may further clarify the prior processed input 54 and allow the bot server program 40 to produce a more useful output 50. In response to receiving a processed input 43 following the prompt 52 for an input, the bot server program 40 may programmatically generate an output 50 based on at least the processed input 43 received following the prompt 52 and at least one processed input 54 received prior to generating the prompt 52. The selected output type 49 may also be selected based at least in part on the one or more prior processed inputs 54. In some dialogs, the bot server program 40 may prompt the user to enter an additional input 42 more than once. If the bot server program 40 has more than one prior processed input 54, it may generate an output 50 based on one or more of the prior processed inputs 54.

When the bot server program 40 determines that the selected output type 49 includes speech, the speech may be output using a voice 56 selected from a plurality of voices 56. The bot server program 40 may customize a spoken response using a custom "voice font," for example so that it matches the voice of a company's brand ambassador.

Figure 2A:
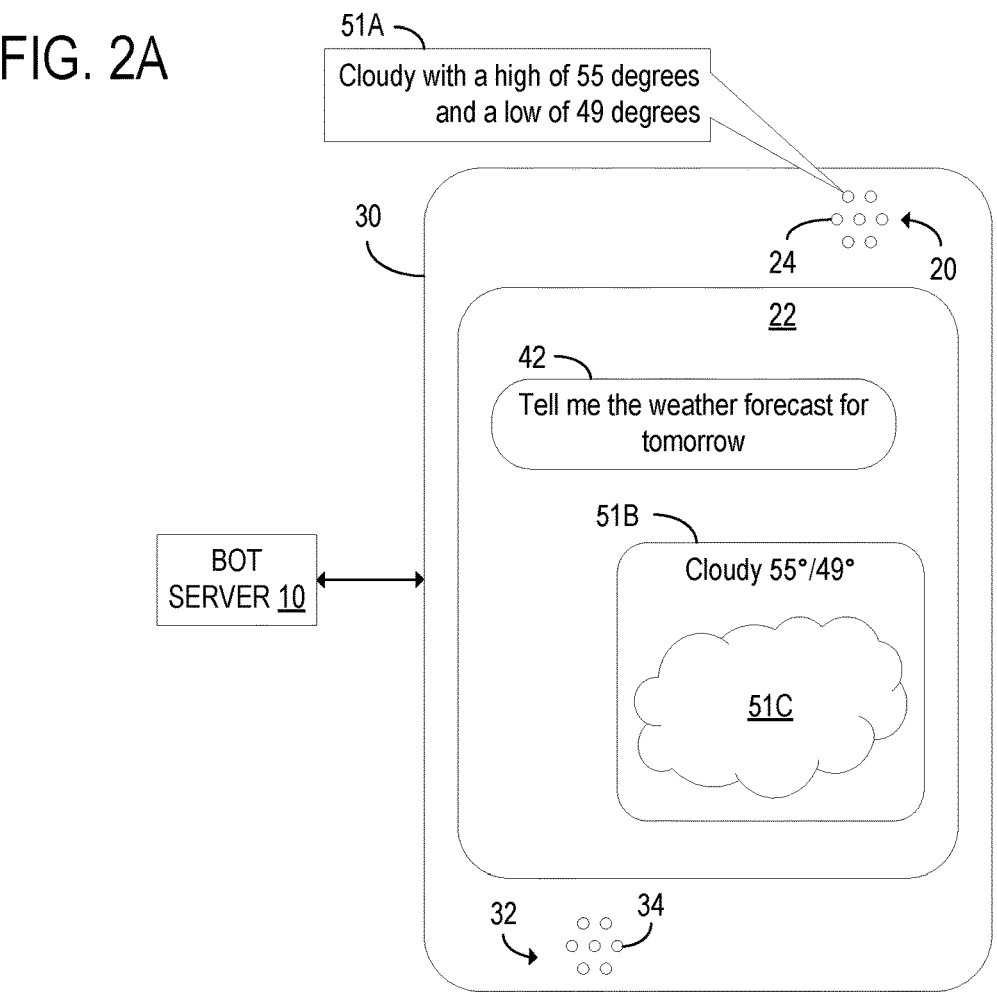
FIG. 2A shows an example use case scenario in which the computing device is a mobile phone, according to an embodiment of the present disclosure.

An example use case scenario is described below. The computing device 30 in the example use case scenario is shown in FIG. 2A. In this example, the computing device 30 is a mobile phone equipped with an input device suite 32 that includes a microphone 34 and an output device suite 20 that includes a display 22 and a speaker 24. The computing device 30 receives the speech input "Hey bot, tell me the weather forecast for tomorrow." The computing device 30 detects the words "Hey bot" using the microphone 34 and uses a speech recognition engine 64 to convert the spoken words "Hey bot" to text. The computing device 30 then uses "Tell me the weather forecast for tomorrow" as input 42. "Tell me the weather forecast for tomorrow" is conveyed to the speech recognition engine 64, which converts it to text and conveys it to the bot client program 60. A text version of the input 42 is displayed on the display 22 of the computing device 30. The bot client program 60 then produces a processed input 43 based on the input 42 and conveys the processed input 43 to the bot server program 40.

The bot server program 40 detects that the processed input 43 has speech as its input type 44. The processed input 43 is then stored in a list of prior processed inputs 54 in case the dialog between the user and the bot includes more than one input 42.

The bot server program 40 programmatically generates an output 50 based on the processed input 43. This output 50 is in a text format before the bot server program 40 determines what output type 46 to use for it. In this example, a text version of the output 50 is "Cloudy with a high of 55 degrees and a low of 49 degrees."

The bot server program 40 detects one or more possible output types 46 based on data included in the processed input 43 that indicates one or more possible output types 46. The bot server program 40 then selects a selected output type 49 from among the possible output types 46. In this example, the bot server program 40, based on device capability data 59 included in the processed input 43, detects that the output device suite 20 of the computing device 30 includes a display 22 and a speaker 24. The bot server program 40 therefore conveys a modified output 51 with a selected output type 49 including text, images, and speech to the computing device 30. The selected output type 49 includes a combination of text, speech, and images. In this example, the bot server program 40 detects that since the input 42 begins with the word "tell," the output type 46 should contain speech. The bot server program 40 also determines that a weather forecast is likely to be more useful to the user if it also contains text and at least one image.

In addition, the bot server program 40 selects a voice 56 from a plurality of voices 56 in which to speak the spoken portion of the output 50. In this example, the selected voice 56 is selected based on settings 58 used by the bot client program 60 and included in the processed input 43.

The bot server program 40 then modifies the output 50 to produce a modified output 51 with the selected output type 49. In this example, the bot server program 40 outputs a spoken component 51A, "Cloudy with a high of 55 degrees and a low of 49 degrees," of the modified output 51, in addition to a text component 51B. The spoken and text components 51A and 51B of the modified output 51 do not necessarily have the same content. In this example, the bot server program 40 produces a modified output 51 that includes the spoken component 51A "Cloudy with a high of 55 degrees and a low of 49 degrees" but the text component 51B "Cloudy 55°/49°." Also, because the modified output 51 is a weather forecast that includes the word "cloudy," the modified output 51 includes an image component 51C depicting a cloud. The modified output 51 is then conveyed for output on the output device suite 20 of the computing device 30.

Figure 2B:
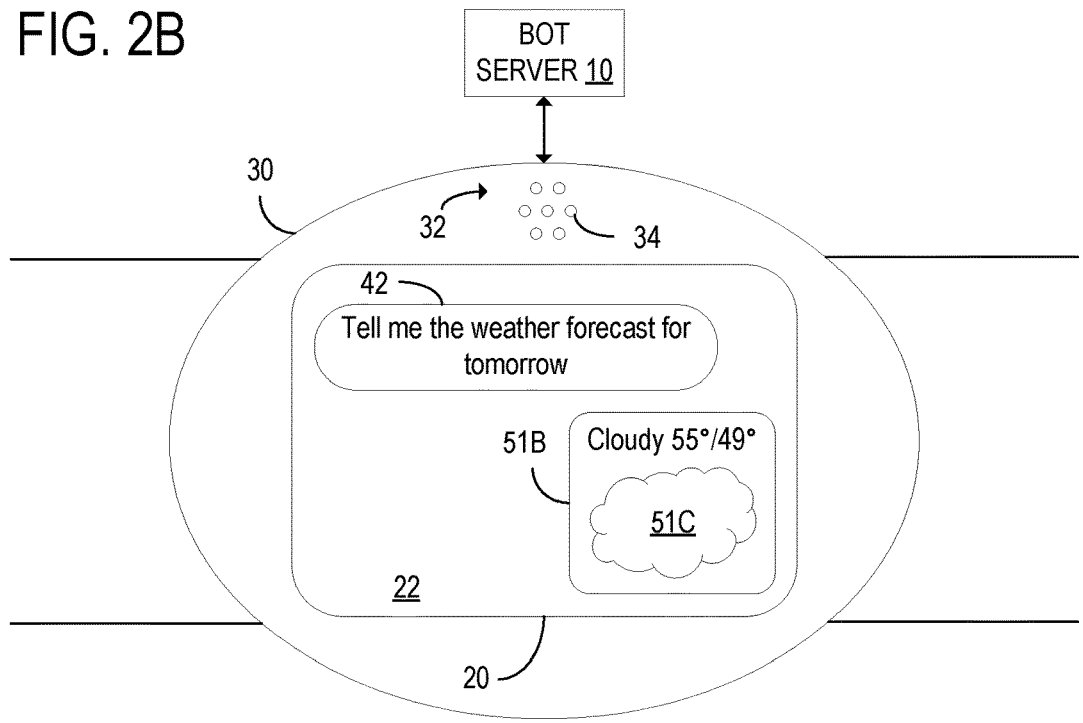
FIG. 2B shows an example use case scenario in which the computing device is a smart watch, according to an embodiment of the present disclosure.

Another example use case scenario is shown in FIG. 2B. In this example, the computing device 30 is a smart watch equipped with an input device suite 32 that includes a microphone 34 and an output device suite 20 that includes a display 22. However, unlike the output device suite 20 in the previous example, the output device suite 20 of the computing device 30 in this example does not include a speaker 24. In this example use case scenario, the computing device 30 receives the same input 42 as in the previous example. However, the device capability data 59 of the computing device 30 does not include speech as a possible output type 46. Thus, the processed input 43 also does not include speech among the possible output types 46. The bot server program 40 modifies the output 50 to produce a modified output 51 with a selected output type 49 that includes text 51B and an image 51C but not speech. The bot server program 40 then transmits the modified output 51 to the computing device 30, where it is displayed on the display 22.

Figure 3:
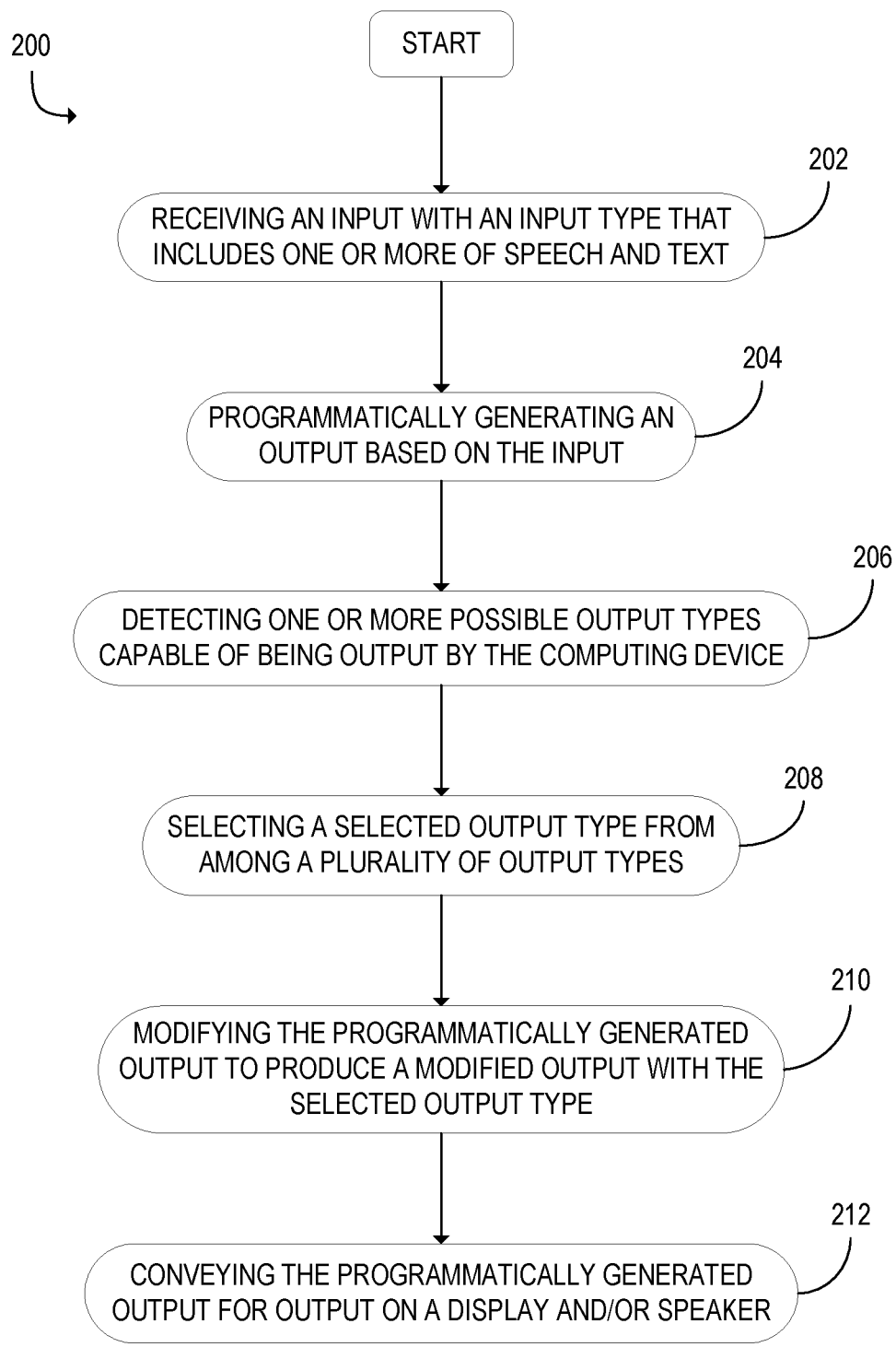
FIG. 3 shows an example method for executing a bot server program using the computing device of FIG. 1, according to an embodiment of the present disclosure.

FIG. 3 shows a method 200 for use with the computing device 30. In this method 200, the computing device 30 executes a bot client program 60 and communicates with a bot server 10 that executes a bot server program 40. At step 202, the bot client program 60 may receive an input 42 with an input type 44 that includes one or more of speech and text. The bot client program 60 may generate a processed input 43. The processed input 43 may include text that is included in the input 42, and may also include text produced by converting speech included in the input 42 to text using a speech recognition engine 64. The bot client program 60 may convey the processed input 43 to the bot server 10.

At step 204, the bot server program 40 may programmatically generate an output 50. The output 50 may be generated based on the processed input 43. The processed input 43 may be stored in a list of prior processed inputs 54.

Advancing from step 204 to step 206, the method 200 may include detecting one or more possible output types 46 capable of being output by the computing device 30. The one or more possible output types 46 may be determined based on the output devices included in the output device suite 20 of the computing device 30. The processed input 43 may contain information that indicates the possible output types 46 of the computing device 30.

At step 208, the bot server program 40 may select a selected output type 49 from a plurality of output types 46. The plurality of output types 46 may include speech and text. Also, the selected output type 49 may be an output type 46 capable of being output by the computing device 30, as detected in step 206. The selected output type 49 may be selected based at least in part on the processed input 43. In addition, the selected output type 49 may selected based at least in part on content included in the output 50. The selected output type 49 may also be selected based at least in part on device capabilities 59 and settings 58 of the computing device 30 used by the bot client program 60 to generate the processed input 43.

The selected output type 49 may include one or both of speech and text. It may also include other forms of output, such as images. When the selected output type 49 includes both speech and text, the speech included in the modified output 51 and the text included in the modified output 51 may include different content. Also, when the modified output 51 includes speech, the bot server program 40 may select a voice 56 from a plurality of voices 56 in which to speak the spoken portion of the modified output 51. The bot server program 40 may also select other characteristics of speech included in the modified output 51, such that the voice may be in a pitch selected from a plurality of pitches, speed selected from a plurality of speeds, emotions selected form a plurality of emotions, accents selected from a plurality of accents, or pronunciation selected form a plurality of pronunciations. For example, the pitch may be modified based on a user-programmable voice pitch setting for the device, which may be useful for certain users that hear better in certain frequency ranges. Similarly, a user-programmable or geography based accent setting may be provided by which a user may specify a particular accent or speed in which the speech should be spoken. Given regional differences in the pronunciation of certain words, settings may be provided for pronunciations of words that have more than one pronunciation, for example. Finally, users' may fine tune the emotional tone of their chatbot by setting an emotional parameter to the speech, such as "cheery," "serious," "robotic," etc.

The dialog between the user and the bot may include more than one input-output pair. The programmatically generated output 50 may include a prompt 52 for an additional input 42. In response to an input 42 following the prompt 52 for an input, the bot server program 40 may programmatically generate an output 50 based on at least the input received following the prompt 52 and at least one processed input 54 received prior to generating the prompt 52. When the bot server program 40 has received more than one input 54 prior to outputting the prompt 52, it may programmatically generate an output 50 based on a plurality of prior processed inputs 54. The selected output type 49 may also be selected based in part on the one or more prior processed inputs 54.

At step 210, the bot server program 40 may modify the programmatically generated output 50 to produce a modified output 51 with the selected output type 49. This modification may include converting text to speech. At step 212, the bot server program 40 may then convey the modified output 51 to the bot client program 60 of the computing device 30 for output on a display 22 and/or speaker 24. The computing device 30 may also output the modified output 51 with other output devices in the output device suite 20.

In some embodiments, the methods and processes described herein may be tied to a computing system of one or more computing devices. In particular, such methods and processes may be implemented as a computer-application program or service, an application-programming interface (API), a library, and/or other computer-program product.

Figure 4:
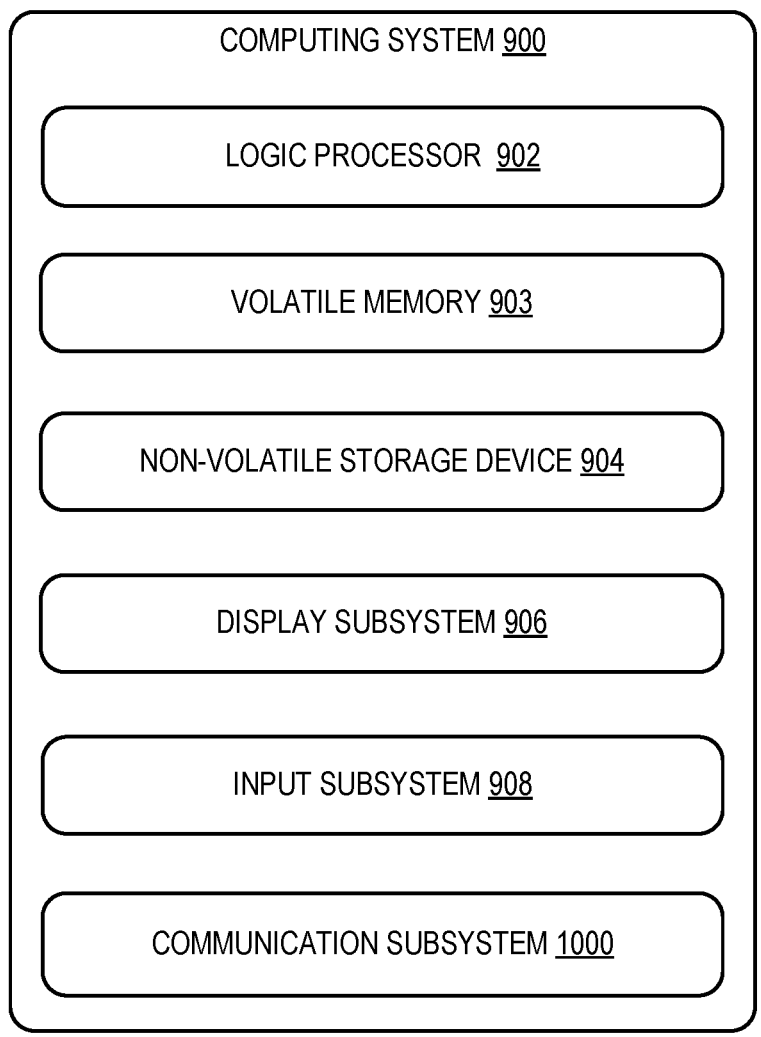
FIG. 4 shows an example computing system according to an embodiment of the present disclosure.

FIG. 4 schematically shows a non-limiting embodiment of a computing system 900 that can enact one or more of the methods and processes described above. Computing system 900 is shown in simplified form. Computing system 900 may embody the computing device 30 of FIG. 1. Computing system 900 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 900 includes a logic processor 902 volatile memory 903, and a non-volatile storage device 904. Computing system 900 may optionally include a display subsystem 906, input subsystem 908, communication subsystem 1000, and/or other components not shown in FIG. 4.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 904 includes one or more physical devices configured to hold instructions executable by the logic processors to implement the methods and processes described herein. When such methods and processes are implemented, the state of non-volatile storage device 904 may be transformed—e.g., to hold different data.

Non-volatile storage device 904 may include physical devices that are removable and/or built-in. Non-volatile storage device 904 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 904 may include nonvolatile, dynamic, static, read/write, read-only, sequential-access, location-addressable, file-addressable, and/or content-addressable devices. It will be appreciated that non-volatile storage device 904 is configured to hold instructions even when power is cut to the non-volatile storage device 904.

Volatile memory 903 may include physical devices that include random access memory. Volatile memory 903 is typically utilized by logic processor 902 to temporarily store information during processing of software instructions. It will be appreciated that volatile memory 903 typically does not continue to store instructions when power is cut to the volatile memory 903.

Aspects of logic processor 902, volatile memory 903, and non-volatile storage device 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 904, using portions of volatile memory 903. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 906 may be used to present a visual representation of data held by non-volatile storage device 904. The visual representation may take the form of a graphical user interface (GUI). As the herein described methods and processes change the data held by the non-volatile storage device, and thus transform the state of the non-volatile storage device, the state of display subsystem 906 may likewise be transformed to visually represent changes in the underlying data. Display subsystem 906 may include one or more display devices utilizing virtually any type of technology. Such display devices may be combined with logic processor 902, volatile memory 903, and/or non-volatile storage device 904 in a shared enclosure, or such display devices may be peripheral display devices.

When included, input subsystem 908 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1000 may be configured to communicatively couple various computing devices described herein with each other, and with other devices. Communication subsystem 1000 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 900 to send and/or receive messages to and/or from other devices via a network such as the Internet.

According to one aspect of the present disclosure, a server is provided, comprising a processor. The processor may be configured to execute a bot server program to receive from a computing device an input with an input type that includes one or more of speech and text. The bot server program may be further configured to programmatically generate an output, wherein the output is generated based on the input. In addition, the bot server program may be configured to detect one or more output types capable of being output by the computing device. The bot server program may select an output type from a plurality of output types, wherein the plurality of output types includes speech and text, and wherein the selected output type is an output type capable of being output by the computing device. The bot server program may be further configured to modify the programmatically generated output to produce a modified output with the selected output type. The bot server program may be configured to convey the modified output to the computing device for output on a display and/or speaker.

In this aspect, the bot server program may select the output type based on the input.

In this aspect, the bot server program may select the output type based on content included in the output.

In this aspect, the bot server program may select the output type based on settings of the computing device.

In this aspect, the bot server program may convey a prompt to select an output type from a plurality of output types.

In this aspect, the processor may be configured to receive an input that includes a selected output type.

In this aspect, the modified output may include both speech and text.

In this aspect, the speech included in the output and the text included in the output may include different content.

In this aspect, the programmatically generated output may include a prompt for input.

In this aspect, in response to an input following the prompt for input, the bot server program may programmatically generate an output based on at least the input received following the prompt for input and at least one input received prior to generating the prompt for input.

In this aspect, the modified output may include speech, and the speech may be in a voice selected from a plurality of voices.

According to another aspect of the present disclosure, a method for use with a server is provided, comprising, at a bot server program executed on a processor, receiving from a computing device an input with an input type that includes one or more of speech and text. The method may include programmatically generating an output, wherein the output is generated based on the input. The method may further include detecting one or more possible output types capable of being output by the computing device. In addition, the method may include selecting an output type from a plurality of output types, wherein the plurality of output types includes speech and text, and wherein the selected output type is an output type capable of being output by the computing device. The method may include modifying the programmatically generated output to produce a modified output with the selected output type. The method may further include conveying the modified output to the computing device for output on a display and/or speaker.

In this aspect, the output type may be selected based on the input.

In this aspect, the output type may be selected based on content included in the output.

In this aspect, the output type may be selected based on settings of the computing device.

In this aspect, the modified output may include both speech and text.

In this aspect, the speech included in the output and the text included in the output may include different content.

In this aspect, the programmatically generated output may include a prompt for an input.

In this aspect, in response to an input following the prompt for input, the bot server program may programmatically generate an output based on at least the input received following the prompt for input and at least one input received prior to generating the prompt for input.

According to another aspect of the present disclosure, a server is provided, comprising a processor configured to execute a bot server program to receive from a computing device an input with an input type that includes one or more of speech and text. The bot server program may be configured to detect one or more output types capable of being output by the computing device. The bot server program may be further configured to select an output type from a plurality of output types, wherein the plurality of output types includes speech and text. The bot server program may be configured to select the output type based on content included in the output, the selected output type being an output type capable of being output by the computing device. The bot server program may be further configured to convey a programmatically generated output of the selected output type to the computing device for output on a display and/or speaker.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computing system, comprising:
a bot server device including at least one processor configured to execute a bot server program, to:
  receive from a client computing device an input with an input type that includes one or more of speech and text;
  programmatically generate an output, wherein the output is generated based on the input from the client computing device;
  receive device capability data indicating one or more output devices that are included in the client computing device, the one or more output devices including at least one of a display or a speaker, the device capability data including a user setting that indicates a user-selected preference for audible speech output;
  identify one or more output types capable of being output by the client computing device from among a plurality of server-supported output types based on the device capability data, the plurality of server-supported output types including audible speech and visual text;
  responsive to identifying the user-selected preference for audible speech output and to identifying audible speech as being capable of being output by the client computing device,
    select audible speech as the selected output type from the one or more identified output types capable of being output by the client computing device, and
    modify the programmatically generated output to produce a modified output that includes audible speech;
  responsive to identifying no user-selected preference for audible speech output, and to identifying visual text as being capable of being output by the client computing device, select visual text as the selected output type from the one or more identified output types capable of being output by the client computing device, and modify the programmatically generated output to produce a modified output that includes visual text; and convey the modified output to the client computing device for output via an output device of the one or more output devices associated with the client computing device that is capable of outputting the modified output having the selected output type.

2. The computing system of claim 1, wherein the bot server program selects the output type based on the input.

3. The computing system of claim 1, wherein the bot server program selects the output type based on content included in the output.

4. The computing system of claim 1, wherein the bot server program selects the output type based on settings of the computing device.

5. The computing system of claim 1, wherein the bot server program conveys a prompt to select an output type from the plurality of server-supported output types.

6. The computing system of claim 5, wherein the processor is configured to receive an input that includes the selected output type.

7. The computing system of claim 1, wherein the modified output includes both speech and text.

8. The computing system of claim 7, wherein the speech included in the modified output and the text included in the modified output include different content.

9. The computing system of claim 1, wherein the programmatically generated output includes a prompt for input.

10. The computing system of claim 9, wherein, in response to an input following the prompt for input, the bot server program programmatically generates an output based on at least the input received following the prompt for input and at least one input received prior to generating the prompt for input.

11. The computing system of claim 1, wherein the modified output includes speech, and wherein the speech is in a voice selected from a plurality of voices, a pitch selected from a plurality of pitches, speed selected from a plurality of speeds, emotions selected form a plurality of emotions, accents selected from a plurality of accents, or pronunciation selected form a plurality of pronunciations.

12. A method for use with a computing system, comprising:

at a bot server device including at least one processor configured to execute a bot server program:

receiving from a client computing device an input with an input type that includes one or more of speech and text;

programmatically generating an output, wherein the output is generated based on the input from the client computing device;

receiving device capability data indicating one or more output devices that are included in the client computing device, the one or more output devices including at least one of a display or a speaker, the device capability data including a user setting that indicates a user-selected preference for audible speech output;

identifying one or more possible output types capable of being output by the client computing device from among a plurality of server-supported output types based on the device capability data, the plurality of server-supported output types including audible speech and visual text;

responsive to identifying the user-selected preference for audible speech output and to identifying audible speech as being capable of being output by the client computing device:

selecting audible speech as the selected output type from the one or more identified output types capable of being output by the client computing device, and modifying the programmatically generated output to produce a modified output that includes audible speech;

responsive to identifying no user preference for audible speech output, and to identifying visual text as being capable of being output by the client computing device:

selecting visual text as the selected output type from the one or more identified output types capable of being output by the client computing device, and modifying the programmatically generated output to produce a modified output that includes visual text; and conveying the modified output to the client computing device for output via an output device of the one or more output devices associated with the client computing device that is capable of outputting the modified output having the selected output type.

13. The method of claim 12, wherein the output type is selected based on the input.

14. The method of claim 12, wherein the output type is selected based on content included in the output.

15. The method of claim 12, wherein the output type is selected based on settings of the computing device.

16. The method of claim 12, wherein the modified output includes both speech and text.

17. The method of claim 16, wherein the speech included in the output and the text included in the output include different content.

18. The method of claim 12, wherein the programmatically generated output includes a prompt for an input.

19. The method of claim 18, wherein, in response to an input following the prompt for input, the bot server program programmatically generates an output based on at least the input received following the prompt for input and at least one input received prior to generating the prompt for input.

* * * * *